(12) United States Patent
Harada et al.

(10) Patent No.: US 6,930,836 B2
(45) Date of Patent: Aug. 16, 2005

(54) HEAD-UP DISPLAY DEVICE

(75) Inventors: Takeshi Harada, Shizuoka (JP);
Yoshiyuki Furuya, Shizuoka (JP);
Hideaki Kageyama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/864,530

(22) Filed: Jun. 10, 2004

(65) Prior Publication Data
US 2005/0024490 A1 Feb. 3, 2005

(30) Foreign Application Priority Data

Jul. 29, 2003 (JP) ........................................ 2003-202910
Mar. 25, 2004 (JP) ........................................ 2004-088534

(51) Int. Cl.[7] .............................................. G03B 21/28
(52) U.S. Cl. ........................ 359/632; 359/630; 359/631
(58) Field of Search ................................ 359/632, 630, 359/631, 633, 629, 618, 634, 619; 353/11, 12, 13, 14; 340/815.4, 815.64

(56) References Cited

U.S. PATENT DOCUMENTS

| 5,028,119 | A | * | 7/1991 | Hegg et al. .................. 359/632 |
| 5,237,455 | A | * | 8/1993 | Bordo et al. .................. 359/632 |
| 5,457,575 | A | * | 10/1995 | Groves et al. .............. 359/631 |
| 5,677,701 | A | * | 10/1997 | Okuyama et al. ............... 345/7 |
| 6,049,288 | A | * | 4/2000 | Kawasaki ................. 340/815.4 |

FOREIGN PATENT DOCUMENTS

JP      9-315182     12/1997

* cited by examiner

Primary Examiner—Hung Xuan Dang
(74) Attorney, Agent, or Firm—Armstrong, Kratz, Quintos, Hanson & Brooks, LLP

(57) ABSTRACT

A head-up display device having an excellent appearance, which has a simple structure and an excellent design upon both nonuse and use, is provided. A cover having a shape equivalent to that of an aperture formed on an upper surface of a housing is attached on an upper surface of a retractable reflector. The cover slides on the upper surface of the reflector cooperating with a retractable motion of the reflector, thereby performing the opening and closing action of the aperture. When the reflector takes its falling-down posture, the reflector and its rotation shaft can be shielded from an eye range and the number of the parting lines can be reduced.

9 Claims, 6 Drawing Sheets

HEAD-UP DISPLAY DEVICE

BACKGROUND OF THE INVENTION (1) Field of the Invention

The present invention relates to a head-up display device mounted on a vehicle and so on, and particularly to a head-up display device having a retractable reflector.

(2) Description of the Related Art

So far, an example of such a head-up display device has been disclosed in Japanese Patent Application Laid-Open No. H9-315182. This conventional example will be explained with reference to FIGS. 9A, 9B and 10. FIGS. 9A and 9B illustrate states upon nonuse and use, respectively, of a conventional head-up display device. FIG. 10 is a plan view of the conventional head-up display device shown in FIG. 9A upon nonuse.

As shown in FIGS. 9A and 9B, the conventional head-up display device includes a display element 12 which is received in a box-shaped housing 11 and emits image displaying light such as navigation information, total reflection mirror 13, front side cover 14 that constructs the front side of the housing 11 and performs the opening and closing action being pivoted on a part of the housing 11, and a retractable combiner 16 pivoted on a part of the housing 11. In detail, the front side cover 14 includes a rotation shaft 141 and rotation guide pin 142. Hinges 17, which enable the opening and closing action of the combiner 16, are attached to the combiner 16. The hinges 17 include a rotation shaft 171 and rotation guide pin 172. The front side cover 14 and combiner 16 open or close together rotating pivotally around the rotation shafts 141 and 171, respectively, by respective force applied on the pins 142 and 172.

As shown in FIG. 9A, in a state when the combiner 16 falls down, the front side cover 14 is closed. On the other hand, as shown in FIG. 9B, in a state when the combiner 16 stands up, the front side cover 14 is opened cooperating with the combiner 16 so that a part of light, which is emitted from the display element 12 and reflected by the total reflection mirror 13, is prevented from being shielded by a portion of the housing 11.

In a state shown in FIG. 9B, the combiner 16 changes a light path of an image displaying light L, which is emitted from the display element 12 and reflected by the total reflection mirror 13, thereby providing a final image information, which is formed on the basis of the image displaying light L, to an eye range E of a driver seated on a driving position.

However, in the conventional example as described above, since the combiner 16 is separated from the front side cover 14, therefore upon nonuse as shown in FIG. 10, very many parting lines G are exposed. Further, upon nonuse the hinges 17 are also exposed, causing an unattractive exterior. Accordingly, a head-up display device having an excellent design has been desired.

SUMMARY OF THE INVENTION

It is therefore an objective of the present invention to solve the above problem and to provide a head-up display device having an excellent appearance, which has a simple structure and an excellent design upon both nonuse and use.

In order to attain the above objective, the present invention is to provide a head-up display device comprising:

a display element which is attached inside a housing and emits a specific image displaying light;

a retractable reflector pivoted on a part of the housing, the reflector taking a standing-up condition on which the reflector protrudes from an aperture formed on an upper surface of the housing to the outside of the housing or, alternatively, a falling-down condition on which the reflector is received inside the housing, on the standing-up condition the reflector changing a light path of the image displaying light that has passed through the aperture, thereby providing a final image information formed on the basis of the image displaying light to a specific eye range; and a cover having a shape equivalent to that of the aperture, the cover being attached on an upper surface of the reflector and sliding on the upper surface of the reflector cooperating with a retractable motion of the reflector, and the cover closing the aperture on the falling-down condition of the reflector while the cover opens the aperture on the standing-up condition of the reflector, thereby performing the opening and closing action of the aperture.

With the construction described above, when the reflector changes its posture from the falling-down condition to the standing-up condition, the cover is slid on the upper surface of the reflector toward the inside of the housing so as to open the aperture of the housing, thereby the reflector protrudes from the aperture to the outside of the housing. On the other hand, when the reflector changes its posture from the standing-up condition to the falling-down condition, the cover is slid in the reverse direction in response to the retraction motion of the reflector, thereby the cover closes the aperture so as to shield the reflector within the housing.

In detail, the cover has a shape equivalent to that of the aperture and is attached on the upper surface of the reflector. The cover slides on the upper surface of the reflector cooperating with a retractable motion of the reflector. Therefore, when the reflector takes the falling-down posture, the reflector and its rotation shaft can be shielded from an eye range and the number of the parting lines can be reduced. Therefore, a head-up display device having an excellent design can be provided.

Preferably, an upper edge of the cover protrudes in front further than an upper edge of the reflector on the falling-down condition of the reflector, while the upper edge of the cover slides so as to form a plane flush with that of the upper edge of the reflector on the standing-up condition of the reflector.

With the construction described above, when the reflector takes the falling-down posture, the upper edge of the cover closes the aperture protruding in front further than the upper edge of the reflector. On the other hand, when the reflector takes the standing-up posture, the upper edge of the cover slides so as to form a plane flush with that of the upper edge of the reflector.

That is, when the reflector takes the falling-down posture, the upper edge of the cover protrudes in front further than the upper edge of the reflector, thereby shielding the upper edge of the reflector. Therefore, a head-up display device having an excellent design can be provided. On the other hand, when the reflector takes the standing-up posture, the upper edge of the cover slides so as to form a plane flush with that of the upper edge of the reflector, therefore a head-up display device having an excellent design can be provided even upon the standing-up condition of the reflector. Further, the height of the upper edges of the cover and the reflector can be limited to a minimal necessary height, thereby minimizing the interruption range to the user's view.

Preferably, the reflector includes:

a reflector rotation shaft that is a rotation center of the reflector and is pivoted on a part of the housing; and a reflector guide pin which is displaced around the reflector rotation shaft as the reflector rotates,
wherein a cam, which connects the cover with the reflector, includes:

a cam rotation shaft that is a rotation center of the cam and is pivoted on a part of the housing;

a cam guide hole having a slit-shape, which displaces the cam in response to the displacement of the reflector guide pin, the reflector guide pin being inserted in the cam guide hole; and a cam guide pin which is displaced around the cam rotation shaft as the cam rotates,
wherein the cover includes a cover guide having a slit-shape extending downward, which slides the cover on the upper surface of the reflector in response to the displacement of the cam guide pin, the cam guide pin being inserted in the cover guide.

With the construction described above, when the reflector guide pin is displaced around the reflector rotation shaft as the reflector rotates, the reflector guide pin is inserted in the cam guide hole, and the cam guide pin formed on the cam is displaced in response to the displacement of the reflector guide pin. Then, the cam guide pin is inserted in a slit of the cover guide having a slit-shape and the cover slides on the upper surface of the reflector in response to the displacement of the cam guide pin.

That is, the slide motion of the cover on the reflector is realized through the cam. Therefore, by using such a cam mechanism, a head-up display device having an excellent design can be provided with a simple structure.

Preferably, the cover is a foldable slide-type shutter, and the head-up display device further includes folding means provided inside the housing, the folding means performing the slide motion of the cover in such a manner that the cover is folded cooperating with the rotation of the reflector from the falling-down condition to the standing-up condition.

With the construction described above, when the reflector rotates in response to a change of the posture of the reflector from the falling-down condition to the standing-up condition, the cover slides being folded cooperating with the rotation of the reflector, thereby opening the aperture of the housing so as to allow the standing-up posture of the reflector.

When the reflector rotates in response to a change of the posture of the reflector from the falling-down condition to the standing-up condition, the cover slides being folded cooperating with the rotation of the reflector, therefore a space for receiving the cover can be small. That is, even in a vehicle, in which the distance between a duct and an instrument panel is small, the head-up display device can be received in the instrument panel. Further, since the folding of the cover is carried out by using a force of the sliding of the cover, no particular driving source is needed. Thus, a reliable head-up display device having a simple structure can be provided at a low cost.

Preferably, the cover includes:

a first cover which slides on the upper surface of the reflector; and a second cover pivoted in the vicinity of an end of the first cover, the end facing the inside of the housing, the second cover cooperating with the first cover,
wherein the head-up display device further includes bending means provided inside the housing, the bending means performing the slide motion of the first cover in such a manner that the second cover is bent in a rotation direction of the second cover cooperating with the rotation of the reflector from the falling-down condition to the standing-up condition.

With the construction described above, when the second cover slides up to a predetermined position in the housing in response to a change of the posture of the reflector from the falling-down condition to the standing-up condition, the second cover is bent in its rotation direction in response to the subsequent slide of the first cover, thereby the aperture of the housing is opened so that the reflector takes the standing-up posture.

Therefore a space for receiving the cover can be small. That is, even in a vehicle, in which the distance between a duct and an instrument panel is small, the head-up display device can be received in the instrument panel. Further, since the bending of the cover is carried out by using a force of the sliding of the cover, no particular driving source is needed. Thus, a reliable head-up display device having a simple structure can be provided at a low cost.

DESCRIPTION OF THE PREFERRED EMBODIMENTS

Figure 1A:
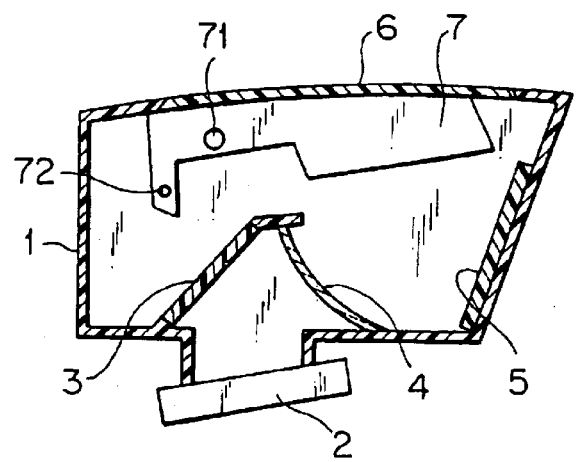
FIGS. 1A and 1B illustrate states upon nonuse and use, respectively, of a head-up display device according to the first preferred embodiment of the present invention.
Figure 1B:
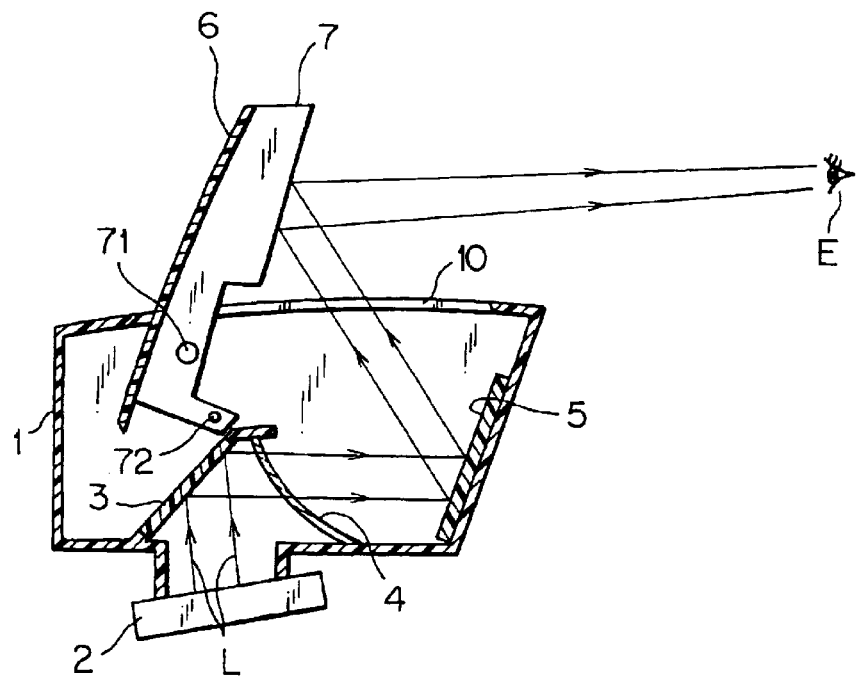

In the following, a first preferred embodiment of the present invention will be explained with reference to the attached drawings. FIGS. 1A and 1B illustrate states upon nonuse and use, respectively, of a head-up display device according to the first preferred embodiment of the present invention. FIGS. 1A and 1B are views viewed from the side.

As shown in FIGS. 1A and 1B, the head-up display device according to the first preferred embodiment of the present invention includes a display element 2 for emitting a specific image displaying light, first mirror 3, front glass 4, second mirror 5, cover 6 which has a shape equivalent to that of an aperture 10 formed on an upper surface of a housing 1, and a retractable reflector 7 that carries out its opening and closing motion being pivoted on a part of the housing 1. The display element 2, first mirror 3, front glass 4, second mirror 5, cover 6, and reflector 7 are all received in the housing 1.

The housing 1 is, for example, made of resin having a black color. The housing 1 has a box-shape and is mounted on an instrument panel situated at the front of a vehicle. The upper surface of the housing 1 is provided with the quadrangular aperture 10 through which an image displaying light emitted from the display element 2 passes to the reflector 7.

The display element 2 emits, for example, an image displaying light corresponding to navigation and so on. The display element 2 is, for example, a fluorescence display tube or a liquid crystal display having a backlight. The first and second mirrors 3, 5 are flat plate-shaped total reflection mirrors having reflectance equal to or higher than 90%. The front glass 4 is, for example, made of flat plate-shaped or slightly concave face-shaped acrylic plate having reflectance approximately equal to 90%. The front glass 4 protects the display element 2 from dust and so on.

The reflector 7 is, for example, a plate-shaped mirror or hologram element. If a mirror is used as the reflector 7, preferably the mirror has a concave face-shape so that a driver can see a virtual image at further distance in front. The reflector 7 is pivoted on a part of the housing 1. That is, the reflector 7 is pivotally rotatable around an axis provided on the housing 1. The reflector 7 includes a reflector rotation shaft 71 that is a rotation center of the reflector 7 and a reflector guide pin 72 which is displaced around the reflector rotation shaft 71 as the reflector 7 rotates. The reflector 7 is normally used as a member for synthesizing a virtual image and foreground, however a total reflection mirror is used here as the reflector 7.

The reflector rotation shaft 71 is consistent with a rotation shaft of an output gear of gears, which engage with a gear directly connected to a motor that generates the drive force for opening and closing the reflector 7. That is, the motor rotates in response to a specific switch operation, then the drive force of the motor is transmitted to the reflector rotation shaft 71 so as to open or close the reflector 7.

The cover 6 attached on the upper surface of the reflector 7 slides on the upper surface of the reflector 7 cooperating with the retractable motion of the reflector 7, thereby carrying out the opening and closing action with the reflector 7. The cooperating mechanism including the sliding action is realized through a cam. The cooperating mechanism will be explained later on with reference to FIGS. 2 and 3. The cover 6 has a quadrangular shape which is equivalent to that of the aperture 10 (see FIG. 4).

As shown in FIG. 1A, when the reflector 7 takes its falling-down posture (upon nonuse), the upper edge of the cover 6 protrudes in front further than the upper edge of the reflector 7. The cover 6 is closed in such a manner that the cover 6 adheres to the aperture 10 of the housing 1, wherein the aperture 10 having the same shape as that of the cover 6. On this condition, the upper surface of the cover 6 is approximately flush with the upper surface of the housing 1 (except the aperture 10). Thus, on the condition in which the reflector 7 falls down, the upper edge of the reflector 7 is shielded by the cover 6 that protrudes further, therefore the head-up display device shows an excellent design.

On the other hand, as shown in FIG. 1B, when the reflector 7 takes its standing-up posture (upon use), the upper edge of the cover 6 is approximately flush with the upper edge of the reflector 7. Thus, on the condition in which the reflector 7 stands up, the cover 6 and the reflector 7 are seen as if they are in one piece, therefore the head-up display device shows an excellent design. On this condition, the reflector 7 changes a light path of an image displaying light L, which is emitted from the display element 2, then is reflected by the first mirror 3, then passes through the front glass 4, then is reflected by the second mirror 5 and then passes through the aperture 10, thereby providing a final image information formed on the basis of the image displaying light L to an eye range E of a driver seated on a driving position.

Figure 2:
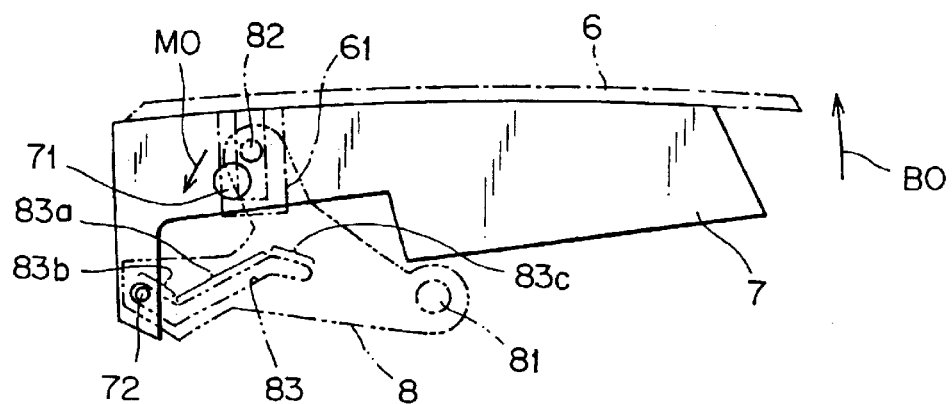
FIG. 2 illustrates a construction of a cover, reflector and cam, which are included in the head-up display device according to the present invention.

In the following, a construction including the cover 6, reflector 7 and cam 8 that connects the cover 6 to the reflector 7 will be explained with reference to FIG. 2. FIG. 2 illustrates the construction of the cover 6, reflector 7 and cam 8, which are included in the head-up display device according to the present invention. FIG. 2 is a side view.

As shown in FIG. 2, the reflector 7 includes: a reflector rotation shaft 71 that is a rotation center of the reflector 7 and is pivoted in a part of the housing 1; and a reflector guide pin 72 which is displaced around the reflector rotation shaft 71 as the reflector 7 rotates.

The reflector rotation shaft 71 is consistent with a rotation shaft of an output gear of gears, which engage with a gear directly connected to a motor that generates the drive force for opening and closing the reflector 7. For example, when the reflector rotation shaft 71 is rotated in a direction of an arrow MO shown in FIG. 2 by the drive force of the motor, the reflector 7 is displaced in a direction of an arrow BO shown in FIG. 2, while when the reflector rotation shaft 71 is rotated in an inverse direction of the arrow MO, the reflector 7 is displaced in an inverse direction of the arrow BO.

The cam 8, which connects the cover 6 to the reflector 7, includes: a cam rotation shaft 81 that is a rotation center of the cam 8 and is pivoted on a part of the housing 1; a cam guide hole 83 having a slit-shape, which displaces the cam 8 in response to the displacement of the reflector guide pin 72 that is inserted in the cam guide hole 83; and a cam guide pin 82 which is displaced around the cam rotation shaft 81 as the cam 8 rotates. In detail, the cam guide hole 83 includes a first cam guide part 83a, second guide part 83b, and third guide part 83c. The second and third guide parts 83b, 83c are provided at the respective ends of the first cam guide part 83a.

The respective guide parts 83a, 83b and 83c are formed in such shapes that when the reflector guide pin 72 is displaced on the first guide part 83a the cover 6 slides on the upper surface of the reflector 7, when the reflector guide pin 72 is displaced on the second guide part 83b the cover 6 is held in a state that the upper edge of the cover 6 protrudes in front further than the upper edge of the reflector 7 without sliding, and when the reflector guide pin 72 is displaced on the third guide part 83c the cover 6 is held in a state that the upper edge of the cover 6 is approximately flush with the upper edge of the reflector 7.

The cover 6 includes a cover guide 61 having a slit-shape extending downward, which slides the cover 6 on the upper surface of the reflector 7 in response to the displacement of the cam guide pin 82 that is inserted in the cover guide 61.

In the following, an action occurred when the reflector 7 cooperates with the cover 6 will be explained with reference to FIG. 3. FIG. 3A–3D illustrates the action occurred when the reflector 7 and cover 6 cooperate with each other upon opening and closing of the reflector 7. Here, the action upon opening of the reflector 7 will be explained.

Figure 3A:
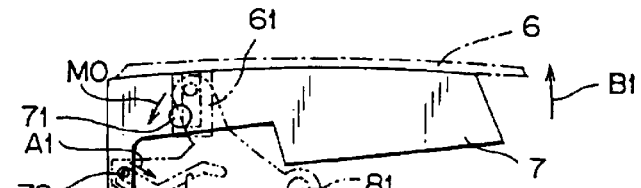
FIG. 3A–3D illustrate an action when a reflector and cover cooperate with each other upon opening and closing of the reflector.
Figure 3B:
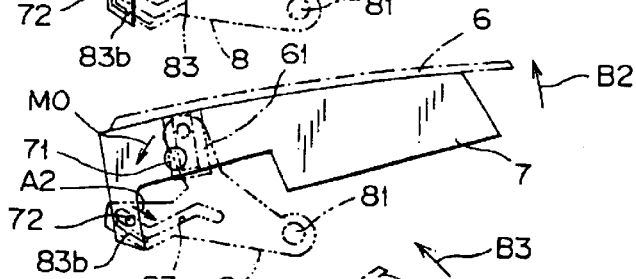

As shown in FIG. 3A, on the falling-down condition of the reflector 7, the upper edge of the cover 6 protrudes in front further than the upper edge of the reflector 7. On this condition, when the reflector rotation shaft 71 starts to rotate in the direction of an arrow M0, the reflector guide pin 72 starts to be displaced on the second guide part 83b in the direction of an arrow A1. FIG. 3A corresponds to the falling-down condition of the reflector 7 shown in FIG. 1. When the reflector rotation shaft 71 further rotates in the direction of the arrow M0, the reflector guide pin 72 is displaced on the second guide part 83b in a direction of an arrow A2 as shown in FIG. 3B. Although the displacement of the reflector guide pin 72 is a circular motion around the reflector rotation shaft 71, since the second guide part 83b has a slit-shape so as not to prevent this circular motion, therefore the cover 6 never slides while the reflector guide pin 72 is displaced on the second guide part 83b. However, since the reflector 7 carries out its opening motion in a direction of an arrow B1 shown in FIG. 3A and in a direction of an arrow B2 shown in FIG. 3B as the reflector rotation shaft 71 rotates, therefore the cover 6 also carries out its opening motion in response thereto.

Figure 3C:
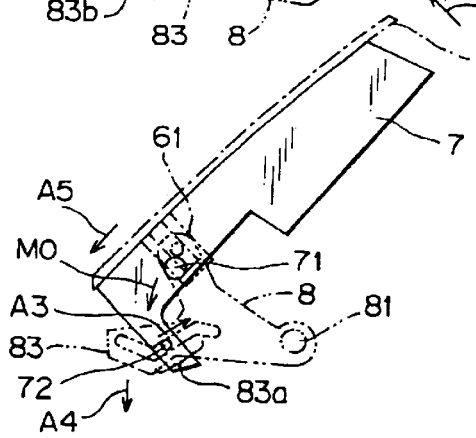

When the reflector rotation shaft 71 keeps rotating in a direction of an arrow M0, as shown in FIG. 3C, the reflector guide pin 72 subsequently starts to be displaced on the first guide part 83a in a direction of an arrow A3. Since the first guide part 83a has a slit-shape so as to prevent the circular motion described above, the cam 8 is pushed in the direction of an arrow A4 due to the displacement of the reflector guide pin 72 in the direction of the arrow A3. Then, the cam guide pin 82 pushes the cam guide hole 83 in a direction of an arrow A5 and as a result, the cover 6 is also slid in the direction of the arrow A5. The cover 6 keeps sliding in the direction of the arrow A5 as long as the reflector guide pin 72 is displaced on the first guide part 83a. Simultaneously, the cover 6 carries out its opening motion with the reflector 7 as the reflector rotation shaft 71 rotates as shown by an arrow B3.

Figure 3D:
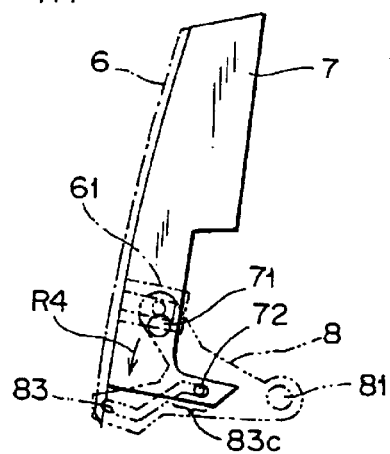

When the reflector rotation shaft 71 further keeps rotating in a direction of an arrow M0, as shown in FIG. 3D, the reflector guide pin 72 subsequently starts to be displaced on the third guide part 83c in a direction of an arrow A6. Since the third guide part 83c has a slit-shape so as not to prevent the circular motion described above similarly to the second guide part 83b, the cover 6 carries out its opening motion without sliding as long as the reflector guide pin 72 is displaced on the third guide part 83c. When the reflector guide pin 72 reaches the third guide part 83c by way of the first guide part 83a, the upper edge of the cover 6 is already flush with the upper edge of the reflector 7. This cover 6 is maintained in this state without sliding until the reflector guide pin 72 reaches an opposite end of the third guide part 83c. FIG. 3D corresponds to the standing-up condition of the reflector 7.

An action upon closing of the reflector 7 is not explained here because it is simply a reverse action to the action upon opening of the reflector 7.

In the preferred embodiment described above, the second and third guide parts 83b, 83c correspond to slide-stop periods of the cover 6. However, instead, these slide-stop periods may not be set depending on the speed of opening and closing of the reflector 7 and the sliding distance of the cover 6.

Figure 4:
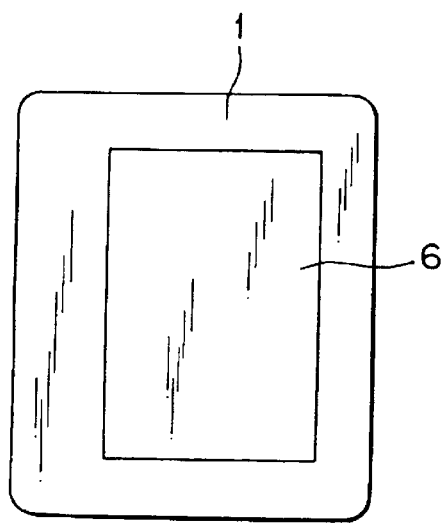
FIG. 4 is a plan view of the head-up display device according to the present invention upon nonuse.

Thus, since the slidable cover 6 having a shape equivalent to that of the aperture 10 is attached on the upper surface of the reflector 7, as shown in FIG. 4, when the reflector 7 takes its falling-down posture (i.e. upon nonuse), the reflector 7 and the rotation shaft 71 (i.e. a substitute for the hinge in the conventional example) can be shielded from an eye range E and the number of the parting lines can be reduced. By using the cam mechanism as described above, this effect can be obtained with a simple construction. That is, a head-up display device having an excellent design can be provided by using a simple structure.

The shapes of the cam and guide hole and length of the guide described above are examples. They may be modified by one skilled in the art without departing from the spirit and scope of the present invention.

In the following, a second preferred embodiment of the present invention will be explained with reference to the attached drawings.

Figure 5A:
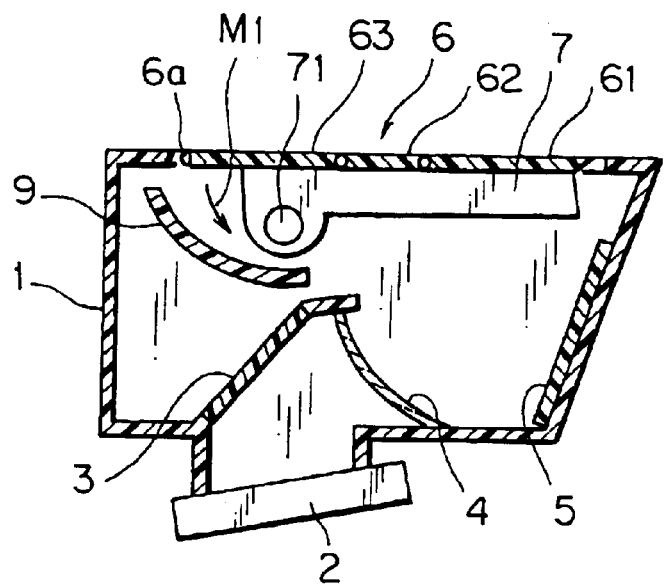
FIGS. 5A and 5B illustrate states upon nonuse and use, respectively, of a head-up display device according to the second preferred embodiment of the present invention.
Figure 5B:
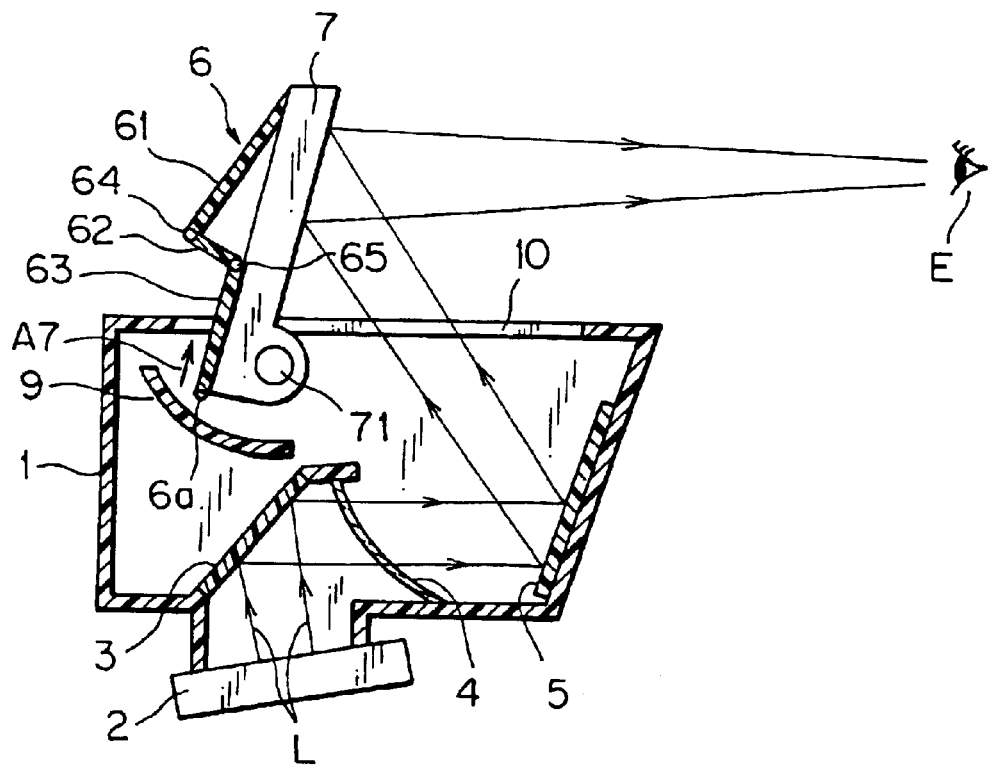

FIGS. 5A and 5B illustrate states upon nonuse and use, respectively, of a head-up display device according to the second preferred embodiment of the present invention. FIGS. 5A and 5B are views viewed from the side.

As shown in FIGS. 5A and 5B, a head-up display device according to the second preferred embodiment of the present invention includes a display element 2, first mirror 3, front glass 4, second mirror 5, cover 6, and a retractable reflector 7 that carries out its opening and closing motion being pivoted on a part of the housing 1. The display element 2, first mirror 3, front glass 4, second mirror 5, cover 6, and reflector 7 are all received in the housing 1.

The points different from the first preferred embodiment are that the cover 6 is a foldable slide-type shutter and that the head-up display device further includes a guide member 9 provided inside the housing 1, wherein the guide member 9 folds the cover 6.

Figure 6:
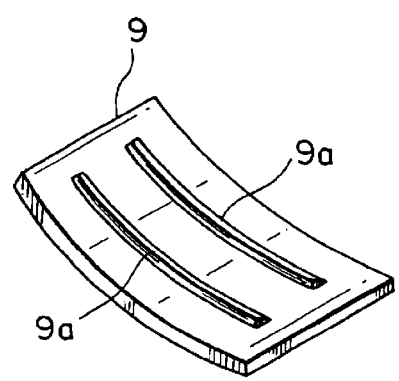
FIG. 6 is a perspective view of a guide member in the head-up display device shown in FIG. 5.

FIG. 6 is a perspective view of the guide member 9 in the head-up display device shown in FIG. 5. As shown in FIG. 6, the profile of the guide member 9 is formed approximately rectangular. The guide member 9 comes in contact with an end 6a of the cover 6 and controls the movement of the cover 6 in response to the rotation of the reflector 7 around the reflector rotation shaft 71.

A direction indicated by an arrow M1 shown in FIG. 5A shows an direction when the reflector 7 changes its posture from the falling-down posture to the standing-up posture. The cross section of the guide member 9 in a direction parallel to the direction M1 is formed approximately in a arc-shape so that the cover 6 is pushed in a direction indicated by an arrow A7 shown in FIG. 5B as the reflector 7 reaches its standing-up condition in response to the rotation of the reflector 7 in the direction M1.

As shown in FIG. 6, in the second preferred embodiment, A surface of the guide member 9 is provided with a plurality of rails 9a (for example, two rails 9a) that come in contact with the end 6a of the cover 6. Thus, the end 6a of the cover 6 comes in contact with only the rails 9a, thereby attaining a smooth movement of the cover 6 with a simple structure. However, instead, the end 6a of the cover 6 may directly come in contact with the surface of the guide member 9.

In the second preferred embodiment, as an example, the cover 6 includes three plate-shaped slide covers 61, 62 and 63 and movable fulcrum shafts 64 and 65 for pivoting the slide covers 61 and 62 and for pivoting the slide covers 62 and 63, respectively, thereby enabling to fold the slide covers 61, 62 and 63 by using the movable fulcrum shafts 64 and 65 as fulcrum shafts. If the cover 6 is folded a plurality of times, the number of the slide covers and the number of the movable fulcrum shafts are increased.

Figure 7A:
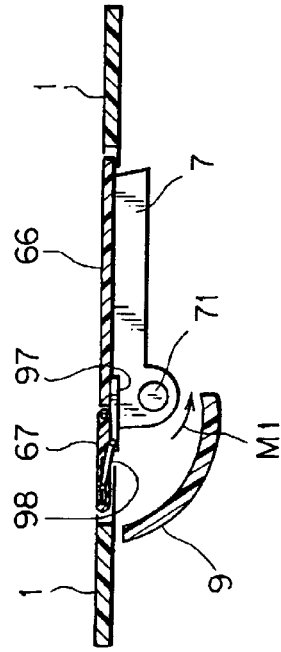
FIGS. 7A and 7B illustrate an example of the slide mechanism of the cover in the states upon nonuse and use, respectively, of the head-up display device according to the second preferred embodiment of the present invention.
Figure 7B:
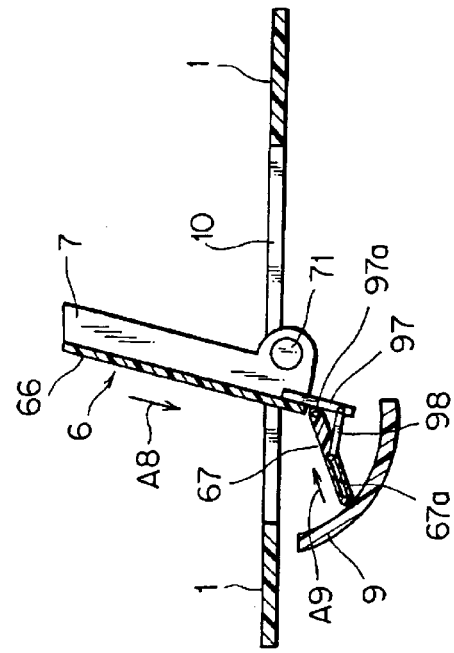

FIGS. 7A and 7B illustrate an example of the slide mechanism of the cover in the states upon nonuse and use, respectively, of the head-up display device according to the second preferred embodiment of the present invention. FIGS. 7A and 7B are views viewed from the side.

As shown in FIGS. 7A and 7B, a slide mechanism 90 includes a hinge 91 cooperating with a slide cover 63, hinge 92 cooperating with the hinge 91, hinge 93 cooperating with the hinge 92, hinge 94 fixed to a slide cover 61 cooperating with the hinge 93. The hinge 92 is rotatably fixed to the reflector 7 with a hinge rotation shaft 95. The hinge 94 slides along a guide groove 96 formed in a slit-shape on the reflector 7.

In the slide mechanism 90, synchronously to the rotation motion of the reflector 7 in the direction M1 (see FIG. 5A) for changing the posture of the reflector 7 from its falling-down posture (FIG. 7A) to its standing-up posture (FIG. 7B), when the slide cover 63 is pushed in the direction A7 (see FIG. 5B) by the guide member 9, the hinge 91 fixed to the slide cover 63 is pushed up.

Then, the hinge 92 that is connected with the hinge 91 rotates around the hinge rotation shaft 95 cooperating with the pushing-up of the hinge 91, thereby the hinge 93 that is connected with the hinge 92 is pulled down along the guide groove 96 in a direction of an arrow A8 shown in FIG. 7B. Then, the hinge 94 that is connected with the hinge 93 is pulled down in the direction A8 cooperating with the pulling-down of the hinge 93.

Thereby, the slide cover 61 is pulled in the direction A8. Since the movement of the slide cover 61 is restricted by the movable fulcrum shafts 64 and 65, as shown in FIG. 7B, the slide cover 61 is slid in such a manner that the slid covers 61 and 62 are folded.

On a condition that the cover 6 is folded, there might be an occurrence of vibration sound from the movable fulcrum shaft 64 and so on due to the vibration of a vehicle. Therefore, the movable fulcrum shaft 64 is biased in a reverse direction (i.e. return direction of the cover) to the direction A8 by using a resilient member such as a spring (not shown in the figure).

As is seen from the explanation as described above, in the second preferred embodiment, the cover 6 is slid in such a manner that the cover 6 is folded with the guide member 9 and the slide mechanism 90 in cooperation with the rotation of the reflector 7 from the falling-down posture to the standing-up posture. That is, the guide member 9 and the slide mechanism 90 function as the folding means.

In the following, an action of the head-up display device when the reflector 7 and the cover 6 cooperate with each other will be explained with reference to FIG. 5.

As shown in FIG. 5A, on the falling-down condition of the reflector 7, the upper edge of the slide cover 61 of the cover 6 protrudes in front further than the upper edge of the reflector 7, thereby the aperture 10 of the housing 1 is closed. On this condition, when the reflector rotation shaft 71 starts to rotate in the direction M1, the end 6a of the slide cover 6 comes in contact with the rail 9a of the guide member 9 and the slide cover 91 is pushed up as the reflector 7 rotates.

By this pushing-up, the slide covers 61 and 62 of the slide mechanism 90 start to slide being folded in response to the rotation of the reflector 7. When the reflector reaches its standing-up condition, as shown in FIG. 5B, the upper edge of the slide cover 61 of the cover 6 has already formed a plane flush with the upper edge of the reflector 7 and the cover 6 is folded.

An action occurred when the condition of the reflector 7 is changed from the standing-up condition to the falling-down condition is a reverse action to the action described above, therefore the explanation is omitted. When the condition of the reflector 7 is changed from the standing-up condition to the falling-down condition, a bias applied in a reverse direction (i.e. return direction of the cover) to the direction A8 is used with a resilient member (not shown in the figure) with respect to the movable fulcrum shaft 64.

Thus, when a head-up display device is constructed according to the second preferred embodiment, since the slidable cover 6 having a shape equivalent to that of the aperture 10 is attached on the upper surface of the reflector 7, as shown in FIG. 5, when the reflector 7 takes its falling-down posture (i.e. upon nonuse), the reflector 7 and the rotation shaft 71 (i.e. a substitute for the hinge in the conventional example) can be shielded from an eye range E and the number of the parting lines can be reduced. That is, a head-up display device having an excellent design can be provided by using a simple structure.

When the reflector 7 rotates in response to a change of the posture of the reflector 7 from the falling-down condition to the standing-up condition, the cover 6 slides being folded cooperating with the rotation of the reflector 7, therefore a space for receiving the cover 6 can be small. That is, even in a vehicle, in which the distance between a duct and an instrument panel is small, the head-up display device can be received in the instrument panel. Further, since the folding of the cover 6 is carried out by using a force of the guide member 9 and the slide mechanism 90, no particular driving source is needed. Thus, a reliable head-up display device having a simple structure can be provided at a low cost.

In the following, a third preferred embodiment of the present invention will be explained with reference to the attached drawings.

Figure 8A:
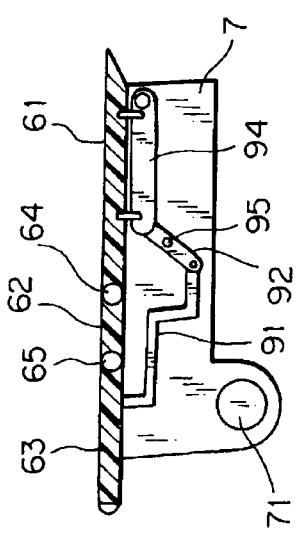
FIGS. 8A and 8B illustrate an example of the action of the cover in the states upon nonuse and use, respectively, of a head-up display device according to the third preferred embodiment of the present invention.
Figure 8B:
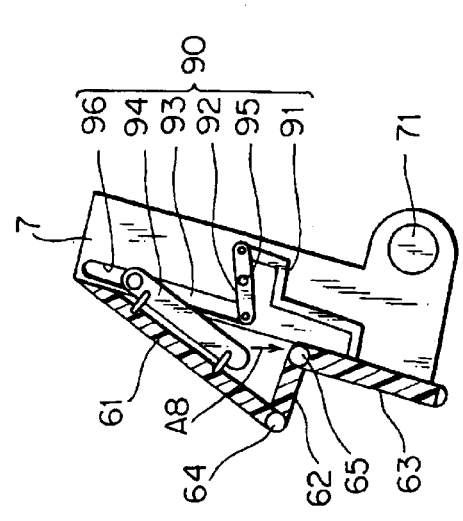
Figure 9A:
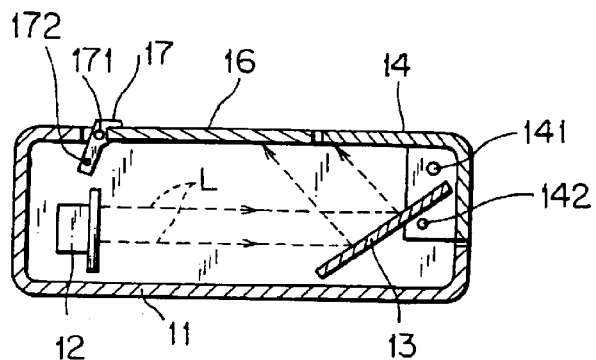
FIGS. 9A and 9B illustrate states upon nonuse and use, respectively, of a conventional head-up display device.
Figure 9B:
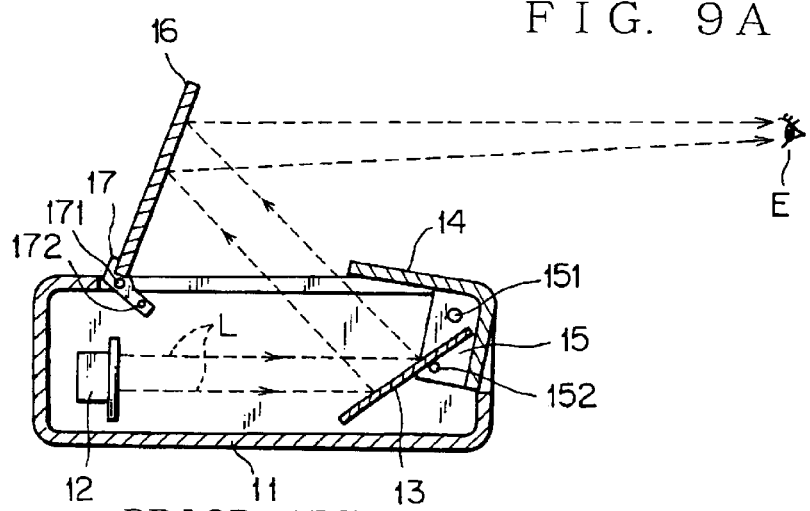
Figure 10:
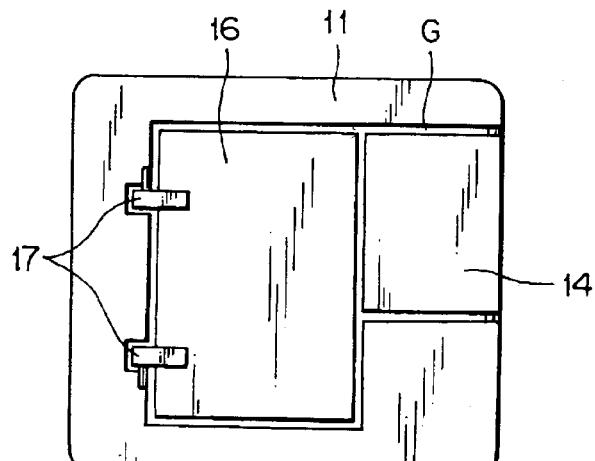
FIG. 10 is a plan view of the conventional head-up display device shown in FIG. 9A upon nonuse.

FIGS. 8A and 8B illustrate an example of the action of the cover in the states upon nonuse and use, respectively, of a head-up display device according to the third preferred embodiment of the present invention. FIGS. 8A and 8B are views viewed from the side.

As shown in FIGS. 8A and 8B, a head-up display device according to the third preferred embodiment of the present invention includes a display element 2, first mirror 3, front glass 4, second mirror 5, cover 6, and a retractable reflector 7 that carries out its opening and closing motion being pivoted on a part of the housing 1. The display element 2, first mirror 3, front glass 4, second mirror 5, cover 6, and reflector 7 are all received in the housing 1.

The points different from the first and second preferred embodiments are that the cover 6 is a bendable slide-type shutter and that the head-up display device further includes a guide member 9 provided inside the housing 1, wherein the guide member 9 bends the cover 6. A basic structure of the guide member 9 is similar to that of the second preferred embodiment, but has a difference in that a cross section of the guide member 9 sectioned in the rotation direction M1 of the reflector 7 is formed in approximately an arc-shape so that the cover 6 can be bent as shown in FIG. 6B as the reflector 7 is reaching the standing-up posture in response to the rotation of the reflector 7 in the direction M1.

In the third preferred embodiment, for example, the cover 6 includes two plate-shaped slide covers 66 and 67. The first slide cover 66 has the same length in its sliding direction as a length of the reflector 7 and the same width as that of the aperture 10 of the housing 1. The second slide cover 67 compensates for a lack of the area of the first slide cover 66 so that the summed area of the first and second slide covers becomes equivalent to the area of the aperture 10.

A hinge rotation shaft 97a that is a rotation center of the slide cover 67 is pivoted on a hinge 97, a part of which is fixed to the slide cover 66. The hinge 97 is connected to one end of a hinge 98 so that the hinge 98 is rotatable around the one end, while an opposite end of the hinge 98 is slidable along a slide groove 67a formed in the slide cover 67.

When the reflector 7 changes its posture from the falling-down posture to the standing-up posture, first the reflector 7 is rotated in the direction M1 on a condition that the slide cover 67 comes in contact with the guide member 9, then when the slide cover 67 reaches a specific position due to the resistance of the guide member 9, the slide cover 67 stops its movement in the direction M1.

When the reflector 7 further rotates in this state, the opposite end of the hinge 98 slides all the way to a finish end of the slide groove 67a along the slide groove 67a in a direction of an arrow A9 shown in FIG. 8B. Then, when the reflector 7 further rotates in this state, the hinge 98 pulls the hinge 97 in a direction of an arrow A8 shown in FIG. 8B, therefore the slide cover 66 connected to the hinge 97 is also pulled down in the direction A8.

Thereby, the slide cover 66 slides being pulled in the direction A8, while the movement of the slide cover 67 is restricted by the guide member 9 and hinges 97 and 98, therefore the sliding is carried out with the slide cover 67 being bent. In this connection, in the state that the cover 6 is bent, since vibration noise might occur from the connection points of the hinges 97, 98 and so on due to the vibration of a vehicle, therefore resilient members (not shown in the figure) are provided at the connection points so as to give respective bias in the reverse direction (i.e. return direction of the cover) to the direction A8.

In the third preferred embodiment, the cover 6 is slid being folded cooperating with the rotation of the reflector 7 from the falling-down posture to the standing-up posture by the guide member 9 and hinges 97 and 98, that is, the guide member 9 and hinges 97 and 98 functions as the bending means.

In the following, an action of the head-up display device when the reflector 7 and the cover 6 cooperate with each other will be explained with reference to FIGS. 8A and 8B.

As shown in FIG. 8A, on the falling-down condition of the reflector 7, since the upper edge of the slide cover 66 of the cover 6 protrudes in front further than the upper edge of the reflector 7, the aperture 10 of the housing 1 is closed. In this state, when the reflector rotation shaft 71 starts to rotate in the direction M1, the end 6a of the slide cover 67 comes in contact with the rail 9a of the guide member 9, then in this state when the slide cover 67 reaches a specific position as the reflector 7 rotates, the slide cover 67 stops its movement in the direction M1.

In this state, when the reflector 7 further rotates, the hinges 97 and 98 slidingly pull down the slide cover 66, so that the slide cover 67 is bent around a contact point between the guide member 9 and the slide cover 67. Then, when the reflector reaches the standing-up condition, as shown in FIG. 8B, a plane of the upper edge of the slide cover 66 of the cover 6 becomes flush with a plane of the upper edge of the reflector 7 and the cover 6 is in its bent condition.

An action occurred when the condition of the reflector 7 is changed from the standing-up condition to the falling-down condition is a reverse action to the action described above, therefore the explanation is omitted. When the condition of the reflector 7 is changed from the standing-up condition to the falling-down condition, a bias applied in a reverse direction (i.e. return direction of the cover) to the direction A8 is used with resilient members (not shown in the figure) provided at the connection points of the hinges 97 and 98.

In the head-up display device according to the third preferred embodiment described above, since the upper surface of the retractable reflector 7 is provided with the slidable cover 6 having an equivalent shape to that of the aperture 10, as shown in FIGS. 8A and 8B, upon the falling-down condition of the reflector 7, that is, upon nonuse of the reflector 7, the reflector 7 and the rotation shaft 71 (i.e. a substitute for the hinge in the conventional example) can be shielded from an eye range E and the number of the parting lines can be reduced. That is, a head-up display device having an excellent design can be provided by using a simple structure.

When the slide cover 67 (i.e. the second cover) slides to a predetermined position in the housing 1 in response to a change of the posture of the reflector 7 from the falling-down condition to the standing-up condition, subsequently the slide cover 66 (i.e. the first cover) is slid in the direction A8 and the slide cover 67 is bent in its rotation direction, therefore a space for receiving the cover 6 can be small. That is, even in a vehicle, in which the distance between a duct and an instrument panel is small, the head-up display device can be received in the instrument panel. Further, since the bending of the cover 6 is carried out by using a force of the slide, no particular driving source is needed. Thus, a reliable head-up display device having a simple structure can be provided at a low cost.

The aforementioned preferred embodiments are described to aid in understanding the present invention and variations may be made by one skilled in the art without departing from the spirit and scope of the present invention.

For example, in the first to third preferred embodiments described above, the sliding of the cover 6 is carried out so that a plane of the upper edge of the cover 6 is flush with that of the upper edge of the reflector 7. However, instead, if the reflector 7 is used as a combiner for superposing the virtual image with the foreground of a vehicle, the cover 6 may be slid being folded or bent until the cover 6 is completely received within the housing 1.

For example, if the head-up display device according to the first to third preferred embodiments described above is received in an instrument panel of a vehicle, the cover 6 may be made of the same material as that of the instrument panel or, alternatively, the surface of the cover 6 may be provided with the same material as that of the instrument panel, thereby improving the outside appearance of the head-up display device upon nonuse, that is, providing the head-up display device having a better design.

What is claimed is:

1. A head-up display device comprising:
 a display element which is attached inside a housing and emits a specific image displaying light;
 a retractable reflector pivoted on a part of the housing, the reflector taking a standing-up condition on which the reflector protrudes from an aperture formed on an upper surface of the housing to the outside of the housing or, alternatively, a falling-down condition on which the reflector is received inside the housing, on the standing-up condition the reflector changing a light path of the image displaying light that has passed through the aperture, thereby providing a final image information formed on the basis of the image displaying light to a specific eye range; and
 a cover having a shape equivalent to that of the aperture, the cover being attached on an upper surface of the reflector and sliding on the upper surface of the reflector cooperating with a retractable motion of the reflector, and the cover closing the aperture on the falling-down condition of the reflector while the cover opens the aperture on the standing-up condition of the reflector, thereby performing the opening and closing action of the aperture.

2. The head-up display device according to claim 1, wherein an upper edge of the cover protrudes in front further than an upper edge of the reflector on the falling-down condition of the reflector, while the upper edge of the cover slides so as to form a plane flush with that of the upper edge of the reflector on the standing-up condition of the reflector.

3. The head-up display device according to claim 2, wherein the reflector includes:
- a reflector rotation shaft that is a rotation center of the reflector and is pivoted on a part of the housing; and
- a reflector guide pin which is displaced around the reflector rotation shaft as the reflector rotates, wherein a cam, which connects the cover with the reflector, includes:
- a cam rotation shaft that is a rotation center of the cam and is pivoted on a part of the housing;
- a cam guide hole having a slit-shape, which displaces the cam in response to the displacement of the reflector guide pin, the reflector guide pin being inserted in the cam guide hole; and
- a cam guide pin which is displaced around the cam rotation shaft as the cam rotates, wherein the cover includes a cover guide having a slit-shape extending downward, which slides the cover on the upper surface of the reflector in response to the displacement of the cam guide pin, the cam guide pin being inserted in the cover guide.

4. The head-up display device as claimed in claim 3, wherein the cover is a foldable slide-type shutter, and the head-up display device further includes folding means provided inside the housing, the folding means performing the slide motion of the cover in such a manner that the cover is folded cooperating with the rotation of the reflector from the falling-down condition to the standing-up condition.

5. The head-up display device as claimed in claim 3, wherein the cover includes:
- a first cover which slides on the upper surface of the reflector; and
- a second cover pivoted in the vicinity of an end of the first cover, the end facing the inside of the housing, the second cover cooperating with the first cover, wherein the head-up display device further includes bending means provided inside the housing, the bending means performing the slide motion of the first cover in such a manner that the second cover is bent in a rotation direction of the second cover cooperating with the rotation of the reflector from the falling-down condition to the standing-up condition.

6. The head-up display device as claimed in claim 2, wherein the cover is a foldable slide-type shutter, and the head-up display device further includes folding means provided inside the housing, the folding means performing the slide motion of the cover in such a manner that the cover is folded cooperating with the rotation of the reflector from the falling-down condition to the standing-up condition.

7. The head-up display device as claimed in claim 2, wherein the cover includes:
- a first cover which slides on the upper surface of the reflector; and
- a second cover pivoted in the vicinity of an end of the first cover, the end facing the inside of the housing, the second cover cooperating with the first cover, wherein the head-up display device further includes bending means provided inside the housing, the bending means performing the slide motion of the first cover in such a manner that the second cover is bent in a rotation direction of the second cover cooperating with the rotation of the reflector from the falling-down condition to the standing-up condition.

8. The head-up display device as claimed in claim 1, wherein the cover is a foldable slide-type shutter, and the head-up display device further includes folding means provided inside the housing, the folding means performing the slide motion of the cover in such a manner that the cover is folded cooperating with the rotation of the reflector from the falling-down condition to the standing-up condition.

9. The head-up display device as claimed in claim 1, wherein the cover includes:
- a first cover which slides on the upper surface of the reflector; and
- a second cover pivoted in the vicinity of an end of the first cover, the end facing the inside of the housing, the second cover cooperating with the first cover, wherein the head-up display device further includes bending means provided inside the housing, the bending means performing the slide motion of the first cover in such a manner that the second cover is bent in a rotation direction of the second cover cooperating with the rotation of the reflector from the falling-down condition to the standing-up condition.

* * * * *